United States Patent [19]

Egan, III et al.

[11] Patent Number: 5,385,240
[45] Date of Patent: Jan. 31, 1995

[54] SCREENING APPARATUS WITH ADJUSTABLE HYDROFOIL PORTION

[75] Inventors: John J. Egan, III, Centerville; James R. Jamieson, Loveland; David E. Suica, Cincinnati; Gary S. Williamson, Middletown, all of Ohio

[73] Assignee: The Black Clawson Company, Middletown, Ohio

[21] Appl. No.: 55,732

[22] Filed: Apr. 30, 1993

[51] Int. Cl.⁶ .............................................. B07B 1/04
[52] U.S. Cl. .................................. 209/273; 209/306; 209/379
[58] Field of Search ............... 209/306, 273, 283, 379; 210/415, 396; 114/280, 274

[56] References Cited

U.S. PATENT DOCUMENTS

| | | | |
|---|---|---|---|
| 3,044,432 | 7/1962 | Wennagel et al. | 114/280 |
| 3,977,348 | 8/1976 | Bordat et al. | 114/280 |
| 4,105,543 | 8/1978 | Seifert | 209/273 X |
| 5,078,275 | 1/1992 | Chupka et al. | 209/273 |

*Primary Examiner*—David H. Bollinger
*Attorney, Agent, or Firm*—Biebel & French

[57] ABSTRACT

Apparatus for screening a papermaking pulp or stock suspension through a stationary cylindrical screen includes a rotating hydrofoil member which has a curved outer or camber surface portion mounted for rotation with the camber surface in a close but spaced proximity to the inside surface of the screen, in which a discrete part or segment of the body of the member is movable with respect to the body and defines a portion of the curved camber surface, so that the effective spacing between the curved surface and the adjacent inside surface of the screen may be adjusted. The hydrofoil is fabricated from sheet metal and forms an outwardly opening spanwise slot, and a sheet metal fabricated segment is received within the slot and forms a substantial continuation of the outer surface, and is adjustable by a threaded fastener which is accessible through a slot formed in the face surface of the hydrofoil.

8 Claims, 4 Drawing Sheets

SCREENING APPARATUS WITH ADJUSTABLE HYDROFOIL PORTION

BACKGROUND OF THE INVENTION

This invention relates to pulp screening apparatus, and more particularly to such apparatus including screens in which one or more rotating foils carried on arms, or other generally radial supports, move in relatively close proximity to a surface of the screen.

Rotating foils, often referred to as hydrofoils, are commonly employed in combination with pulp screening apparatus and move in relative rotation, in close proximity to the inlet surface of a screen plate. Such hydrofoils produce strong positive and negative impulses to the screen plates, which impulses tend to increase the screening capacity while keeping the screen openings clear and free of plugging. Such screen plates are often configured in the form of a cylindrical screen, and the hydrofoil is positioned to run along a radial inside or a radial outside surface of the perforated screen. An example of such a cylindrical screen plate is shown in the U.S. Pat. No. of Chupka et. al., 4,919,797 issued Apr. 24, 1990. However, hydrofoils are also used with non-cylindrical screens, such as conical screens or radially flat screens. An example of the latter is shown in the U.S. Pat. No. 5,078,275 (Chupka et. al.).

The hydrofoils themselves generally consist of a solid air-foil shaped body. When used with a cylindrical screen, the air foil body extends spanwise in a direction generally parallel to the axis of the cylinder. Often the hydrofoil body is formed with a lead angle or helical twist for the purpose of imparting some axial flow to the stock. Such a lead angle is also shown in U.S. Pat. No. 4,919,797 (Chupka et. al.).

While the hydrofoil in a pulp suspension (furnish) behaves differently than an airfoil or propeller section in air, it is convenient to use conventional air foil or propeller terminology in identifying like parts of hydrofoils. Thus, in a cylindrical screen embodiment, the radially outer curved surface which is positioned in closest proximity to the screen may be referred to as the camber surface. The opposite flat surface which faces the axis of rotation may be referred to as the face surface.

For any particular cylinder screen, furnish and a mode of operation, there is usually an optimum spacing, angle of attached and speed of the hydrofoil camber surface with respect to the adjacent surface of the screen for maximum reduction. The minimum available spacing may be defined by the presence of turbulence inducing bars or wear bars on the screen surface or by the profile or shape of the screen openings. As the gap between the role and plate is increased production decreases. Production increases as the gap decreases, so adjustment is critical to peak performance.

Spacing of the hydrofoils is also dictated by the screen roundness, or lack thereof. Out-of-round screens are common, particularly where the screen is fabricated from flat plate material which has been rolled into a cylinder shape and then welded. The actual running position of the foil must take into account any out-of-round characteristics of a particular cylinder, and it is not uncommon for 24-inch diameter cylinder to be out of round by as much as 0.090 inch.

Another factor which can influence the optimum spacing of the camber surface to the adjacent screen surface resides in the characteristic of the furnish being screened. With certain pulps, the suspension can be dirty. If the hydrofoil is positioned too close to the screen, it can cause the screen to wear at an accelerated rate. Further, too close a spacing can impart unnecessary and undue impulse stresses into the screen, which pulses can contribute to premature fracture or failure of such screens.

In cylindrical screening apparatus, adjustments of the radial positions of the hydrofoil has necessitated adjustment of the position of the support arms on the hub, and often has required removal of the screen cylinder from the screening apparatus in order to obtain access for the purpose of making such an adjustment.

Further, while many physical forms of hydrofoils have been suggested and tried, to the inventors' knowledge, such hydrofoils have not been formed bodies which have a separate section or element, movable with respect to the body, to vary the surface characteristics of the hydrofoil and/or to vary the gap or spacing at the throat between the hydrofoil and the screen surface.

SUMMARY OF THE INVENTION

A primary object of the invention is to provide paper pulp screening apparatus and a hydrofoil member for such screening apparatus, in which at least a portion of the camber surface is adjustable apart or separate from the hydrofoil body, to provide an effective adjustment of clearance between the camber surface and the surface of the screen.

In the realization of the invention, the hydrofoil element is provided with a positionable or adjustable body portion or segment, which positionable segment forms a portion or continuation of the camber surface, and which portion is movable with respect to the remaining hydrofoil body. Such segment may be positionable by simple adjustment throughout a range of radial positions by which the actual spacing or clearance between the hydrofoil camber surface and the adjacent screen surface may be chosen and fixed.

In a preferred embodiment of the invention, the adjustable portion of the hydrofoil is a bar-like segment or member which is received at least partially within a radially outwardly facing slot formed in the hydrofoil body. The segment member itself has an outer surface forming a general continuation of the camber surface and the segment member is positionable within the slot for the purpose of adjusting the extent of protrusion or elevation of its outer surface with respect to the hydrofoil body, for effectively adjusting and setting the clearance between the hydrofoil and the screen surface.

The movable camber segment may be divided into individual sections so that the clearance spacing may be varied in accordance with the axial length and position of the sections. In this manner, a portion of the hydrofoil may be configured to operate with a small clearance gap while a different portion of the hydrofoil may be adjusted to operate with a larger clearance gap. The adjustable segment portion of the hydrofoil provides the secondary benefit of being able to control the turbulence level aft or downstream of the adjustable segment, by varying the position of the segment within the principal body portion of the hydrofoil.

In a further aspect of the invention, the hydrofoil itself is fabricated from sheet material, thereby resulting in a structure of high strength and relatively light weight.

It is accordingly an important object of the invention to provide apparatus for screening papermakers' pulp, in which a hydrofoil may be effectively changed in shape by localized movement of an adjustable element or segment.

Another object of the invention is the provision of a hydrofoil as outlined above, in which the gap variation between the camber surface and the screen may be readily adjusted.

Another important object of the invention is the provision of a variable contour hydrofoil and stock preparation apparatus employing such a hydrofoil, in which the running clearance between the hydrofoil and a screen surface may be optimized by adjustment of the hydrofoil contour and may thus also accommodate irregularities or out-or-round conditions in the screen plate itself.

These and other objects and advantages of the invention will be apparent from the following description, the accompanying drawings and the appended claims.

BRIEF DESCRIPTION OF THE ACCOMPANYING DRAWINGS

DESCRIPTION OF PREFERRED EMBODIMENT

A preferred embodiment is illustrated in combination with cylindrical screening apparatus of the general kind shown in the co-owned Seifert U.S. Pat. No. 4,105,543. While the invention is shown as applied to screening apparatus which employs a cylindrical screen, it will be obvious to those skilled in the art that the invention may be applied to screening apparatus with radial flat screen plates and generally radial foil-shaped arms as shown, for example, in the co-owned patent of Chupka et. al., U.S. Pat. No. 5,078,275 of Jan. 7, 1992. Also, while the hydrofoils are shown as rotating adjacent an inwardly curved surface, it is also within the scope of the invention to apply this concept to apparatus in which a hydrofoil rotates about an outer surface of a cylindrical screen, as shown for example in U.S. Pat. No. 3,759,392.

Figure 1:
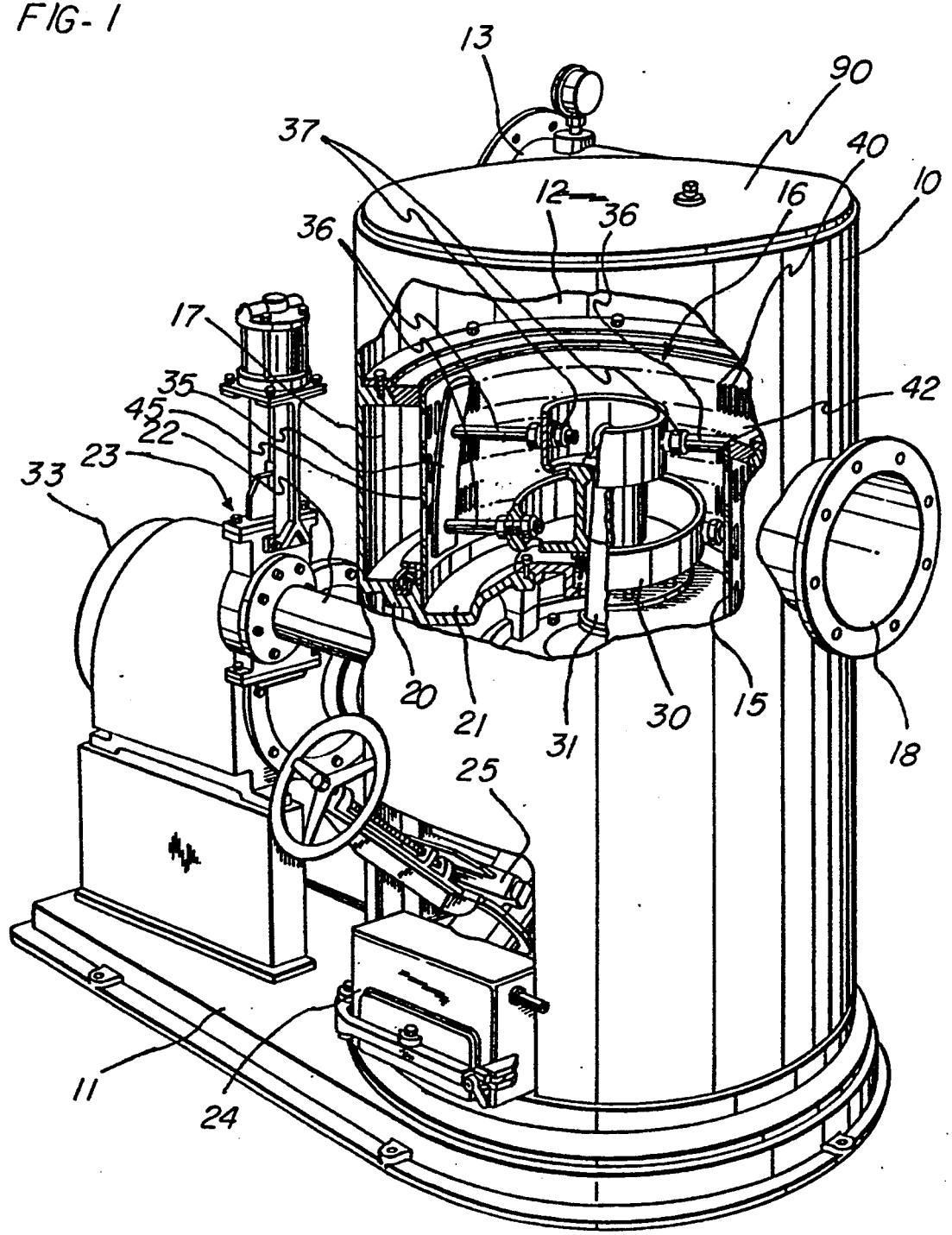
FIG. 1 is a perspective view, partially broken away, illustrating pressure screening apparatus of the general kind in which an embodiment of this invention is applied.

As shown in FIG. 1, the screening apparatus includes a main housing 10 on a base 11. In the upper end of the housing there is an inlet chamber 12 having a tangential inlet port 13 into which the stock suspension to be screened is applied under pressure, and circulated in a clockwise direction as viewed from above. A cylindrical screen 15 divides the interior of the housing below the chamber 12 into a central supply chamber 16 and an accepts chamber 17 having an outlet port 18. The screen 15 is provided with multiple generally vertically oriented individual slots 40 separated by annular non-slotted land areas 42.

The bottom wall 20 of the supply chamber 16 includes a trough 21 leading to a discharge port 22. A control valve assembly 23 can be preset to provide a desired continual bleed of reject-rich stock. Heavier particles which settle into the trough 21 may drop therefrom into a trash collection box 24 through manually controlled valve 25.

A hub or rotor 30 is supported on a vertical drive shaft hub 31 in the center of the supply chamber 16, and is driven by suitable gearing or belt from a motor 33, also mounted on the base 11.

A plurality of individual vanes or hydrofoils 35 are mounted on radial arms 36 and extend vertically generally the full length of the inside screening surface of the cylindrical screen 15. The hydrofoils 35 may be helically curved, or arranged so that the upper end of each vane is leading or spaced forwardly of the lower end in the direction of rotation of the rotor, shown as being clockwise as viewed from the top. While the diagram of FIG. 1 shows the rotor as including only two of the hydrofoils 35, it is preferable to provide four such hydrofoils mounted on the arms 36.

Threaded fasteners 37 attach the inner ends of arms 36 to the rotor 30 and may be adjusted to provide an approximate radial position of the hydrofoil 35 with respect to the inside surface of the screening member. As the hub 30 is rotated, the arms 36 carry the hydrofoils 35 in close proximity to the adjacent curved inside surface of the screen 15.

Figure 2:
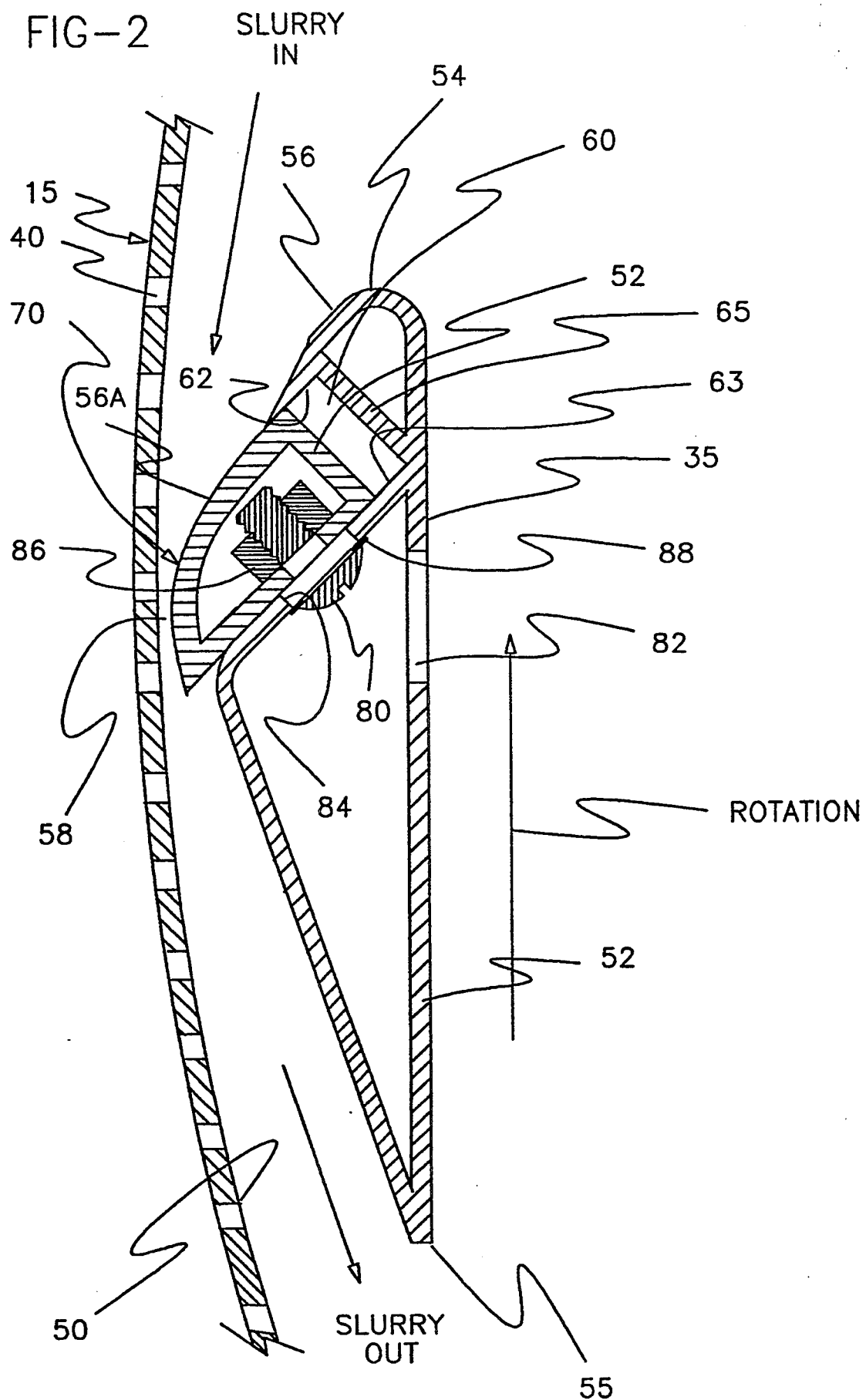
FIG. 2 is a sectional view through a fabricated hydrofoil in accordance with this invention.

The principles of the invention and a preferred embodiment of a sheet metal hydrofoil are illustrated in FIGS. 2 an 3.

FIG. 2 illustrates a sectional view through the improved hydrofoil 35 and a fragment of the adjacent screen 15 which is somewhat diagrammatically illustrated. The improved preferred hydrofoil 35 is shown in FIGS. 2 and 3 as being fabricated from sheet metal, and it is understood that the hydrofoil 35 is suitably mounted at the radial ends of the support rods 36 for rotation in adjacent relation to the interior surface 50 of the cylindrical screen 15.

Figure 3:
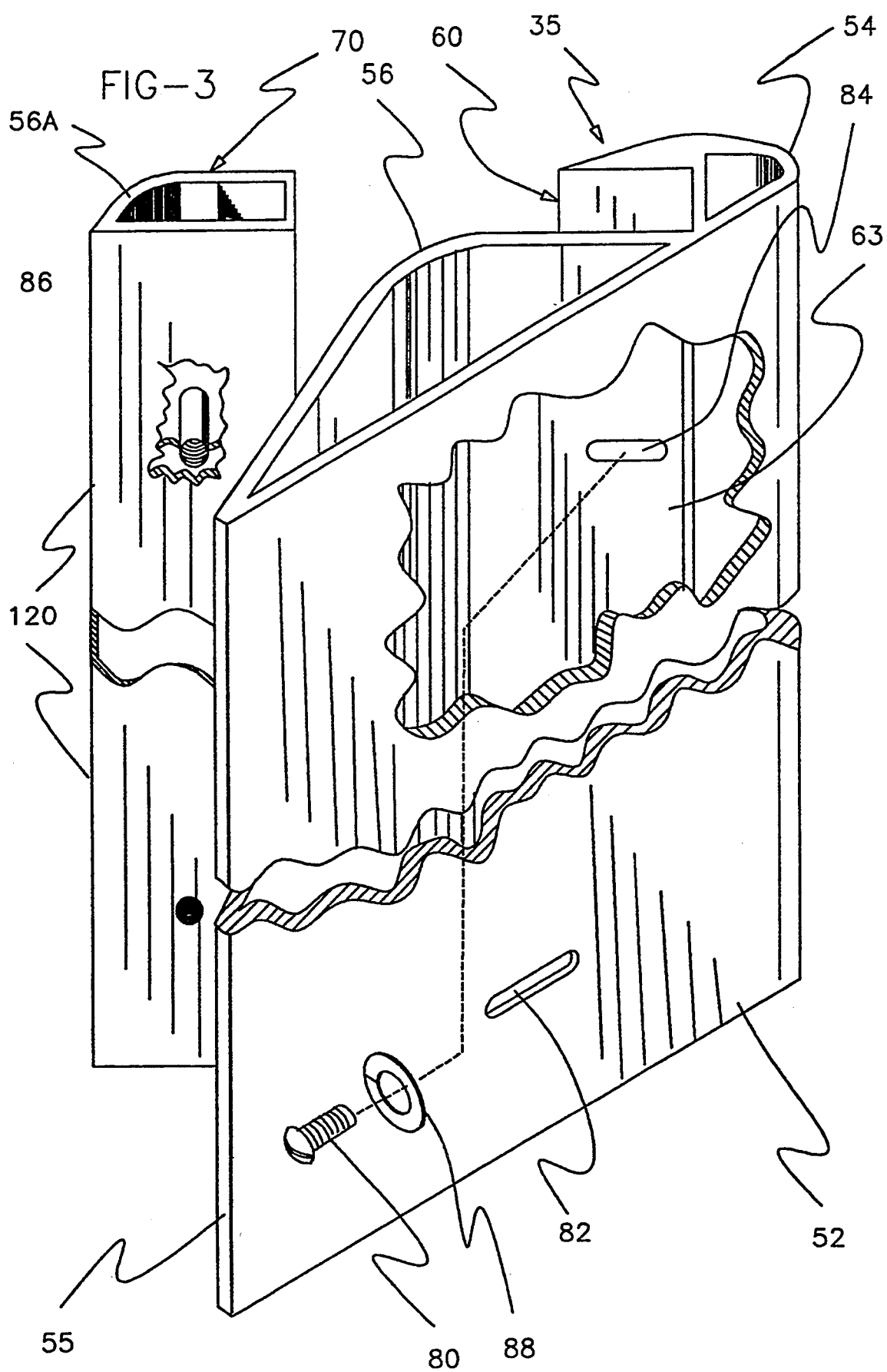
FIG. 3 is a perspective exploded view, partially broken away, of the hydrofoil of FIG. 2.

As shown in FIGS. 2 and 3, the improved hydrofoil 35 is formed with a curved or a flat face 52, which also forms the mounting surface for the rods or arms 36. The face 52 extends between a hydrofoil leading edge or nose 54, at its forward end, and a tail end or trailing edge 55 at its opposite end.

The hydrofoil is formed with a camber surface illustrated generally at 56 positioned adjacent the inside surface 50 of the screen 15 to define a throat or venturi passage 58 between the hydrofoil and the screen inside surface.

The camber surface 56 is interrupted by a diagonally inwardly extending slot 60. The slot 60 is defined by opposed chordwise spaced wall surfaces 62 and 63 and an inner terminating or bottom slot wall 65. The slot 60 opens into the camber surface 56, and receives an adjustable or movable fabricated segment 70 therein. The segment 70 forms means in the hydrofoil member which defines a discrete part thereof and is movable in the slot 60 with respect to the remainder of the hydrofoil, and further has a surface 56a which defines a portion of the curved camber surface 56.

The segment 70 is received within the slot 60 to form a relatively close fit between the walls 62 and 63. As shown, the segment 70 may also be formed of sheet metal, or may be configured in the form of a tubular-like extrusion or maybe formed of a solid material including plastics.

The segment surface 56a which forms a general continuation of the camber surface 56, also forms or defines the throat passage 58, previously mentioned. By suitably adjusting the position of the foil segment 70 within the slot 60 of the foil 35, the venturi shape of the throat passage 58 may be changed or adjusted, and the effective relative position of the foil 35 and the suction created by the foil may be controlled with respect to the inside surface 50 of the screen 15.

Means for adjusting the relative position of the segment 70 within the slot 60 includes a series of threaded screw fasteners 80 which are accessible through recess or access openings 82 formed in the hydrofoil face 52, as shown in FIG. 3.

The fastener 80 extends through a clearance slot 84 in the wall 63 and is threaded into a cylindrical collar or nut 86 received within the interior of the segment 70. Tightening of the fastener 80 causes the fastener head to bear down against a washer 88 on the inside surface of the wall 63, effectively clamping the segment in a predetermined adjusted position within the slot 60. The adjusted position may be determined by visual observation of the hydrofoil when the top plate 90 is removed.

It will be understood that the open spaces in the hydrofoil, as shown in the sectional view of FIG. 2, will be closed at the remote ends thereof by a suitable closure cap, in order to prevent accumulation of stock material in the interior. Further, while the preferred hydrofoil is shown as being fabricated from sheet metal material, it will be understood that other lightweight materials or composites may be used, within the scope of this invention.

In the operation of the invention, the relative position of the segment 70 may be adjusted by removing the cover or plate 90 to the chamber 12 and reaching into the interior while viewing the relative position of the segment in relation to the screen surface 50. The rotor 30 may be moved by hand to verify proper and sufficient clearance through 360° for each of the hydrofoils. The adjustable segments may be clamped in position by inserting a screw driver or other suitable driving tool through the access slot 82 in the face surface.

Figure 4:
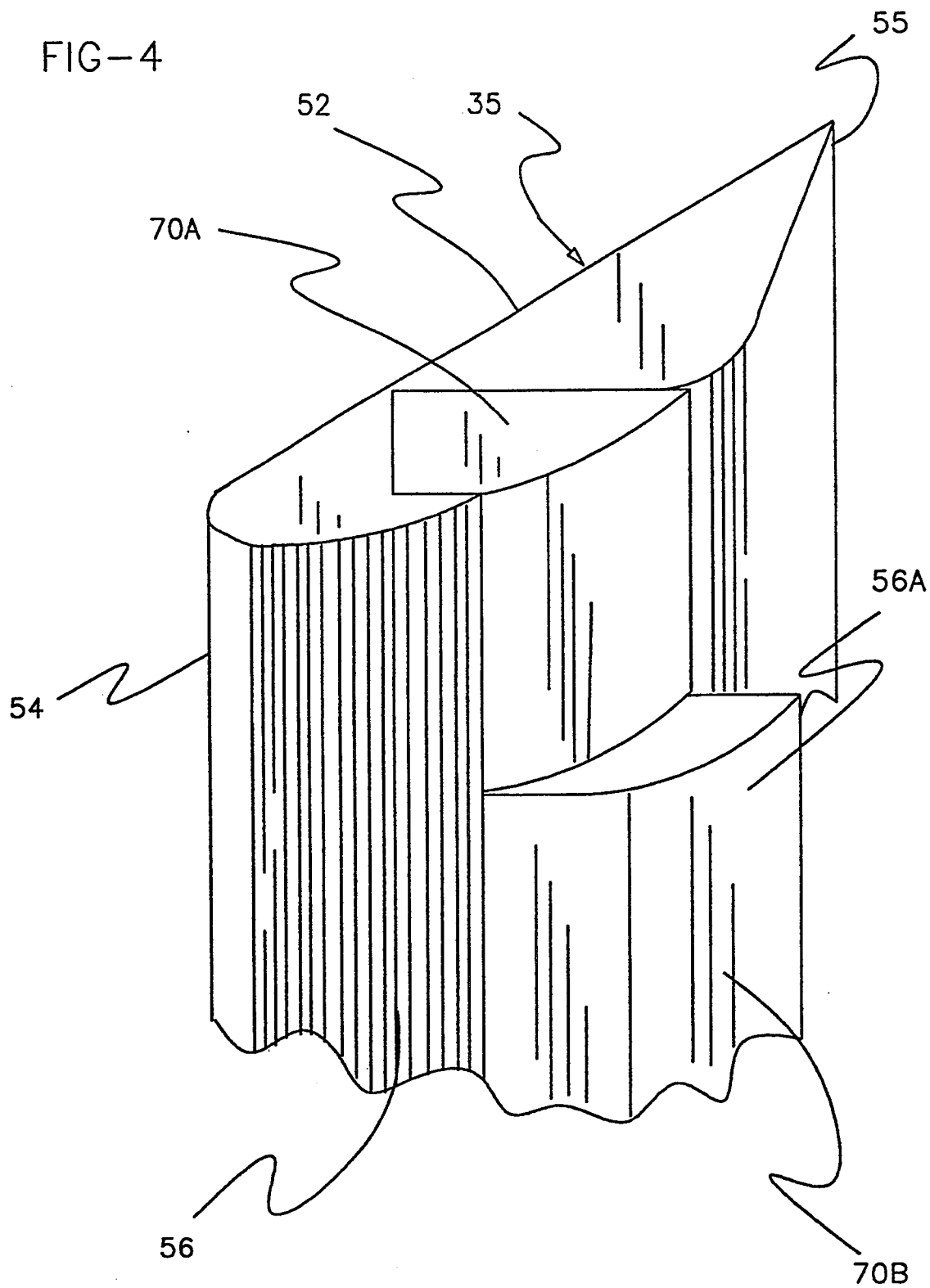
FIG. 4 diagrammatically illustrates a hydrofoil employing a pair of movable segments to vary the spacing at spanwise positions.

As previously noted, the adjustable segment may be formed as a series of individual, longitudinally extending as segments 70a and 70b, diagrammatically illustrated in FIG. 4. The individual segments 70a, 70b are individually adjustable to provide for variations in the dimensions of the passage 58 along particular portions of the hydrofoil. Such variations in the passage 58 may be of particular advantage in decreasing the impulse effect by increasing the clearance at the circumferential non-perforated land areas 42 of the adjacent screen 15. This arrangement has the advantageous effect of reducing the power required to operate the screening apparatus and, at the same time, reducing the stresses applied to the cylindrical screen 15.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. Apparatus for the screening of papermaking stock comprising:
   a stationary screen,
   a hydrofoil member having a curved surface,
   means mounting said hydrofoil member for movement in proximity to said screen,
   means on said member defining a discrete part thereof movable with respect to the remainder of said member, said discrete portion forming at least a portion of said curved surface, and
   means supporting said discrete part on said hydrofoil member in an adjusted position with respect to said screen.

2. An apparatus for screening a papermaking pulp suspension, comprising:
   a circular screen having an inside surface and a central axis,
   a rotating hydrofoil mounted for rotation about said central axis, said hydrofoil having at least one foil body with a radially outer camber surface positioned to move in close proximity to an inside surface of said screen,
   means on said foil body forming a segment of said outer camber surface,
   means mounting said segment for movement movable on said body into any one of a plurality of possible radial positions relative to said body to vary the spacing between said surface segment and said screen inside surface.

3. The apparatus of claim 2 in which said means mounting said segment includes screw means in said body engaging said segment and accessible from a position adjacent said hydrofoil for retaining said segment in an adjusted position.

4. Apparatus for the screening of papermaking stock comprising:
   a stationary generally cylindrical screen having an inside member,
   a rotating hydrofoil member having a curved radially outer surface,
   means mounting said hydrofoil member for rotation with said outer surface in proximity to said inside surface of said screen, comprising:
   means on said hydrofoil member defining a discrete part thereof movable with respect to the remainder of said hydrofoil member, and defining a portion of said curved radially outer surface, and
   means positioning said discrete part on said hydrofoil member in such a manner as to adjust the spacing between said curved surface portion and said screen inside surface.

5. The apparatus of claim 4 in which said hydrofoil member spanwise extends generally parallel to the axis of said screen cylinder, and said discrete part extends at least along a portion of the spanwise extent of said hydrofoil member.

6. The apparatus of claim 5 in which said discrete part is formed in at least two spanwise segments positionable independently of each other on said hydrofoil member.

7. Apparatus for screening a papermaking pulp suspension, comprising:
   a cylindrical screen having an inside surface,
   said screen formed with series of slots extending in circular patterns circumferentially about said screen separated by non-slotted land areas therebetween,
   a rotating hydrofoil mounted on an axis of rotation central to said cylindrical screen,
   said hydrofoil having at least one foil body with a radially outer camber surface mounted in said apparatus to move about said axis in close proximity to said inside surface of said screen, and
   means on said foil body forming a segment of said outer camber surface positioned to form a relatively small clearance space with said screen inside surface at said pattern of slots and a relatively larger clearance space with said screen inside surface at said land areas.

8. A hydrofoil for use in papermaking stock screening apparatus and adapted to rotate about an axis of rotation in spaced relation to an adjacent surface of a screen for treating papermaking stock, comprising:

a body having a camber surface, and means on said body forming a portion of said camber surface movable with respect to said body at least in a direction to vary the space between said portion of said camber surface and the screen.

* * * * *